March 7, 1939.   D. S. KALB   2,150,066
TRAILER HITCH AND FRAME
Filed June 2, 1938   2 Sheets-Sheet 1
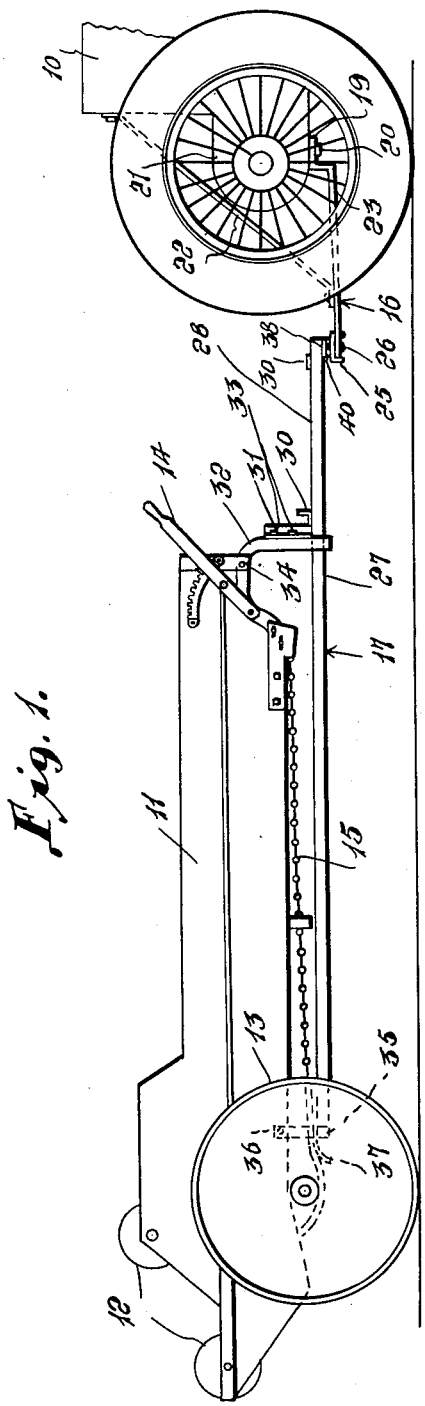
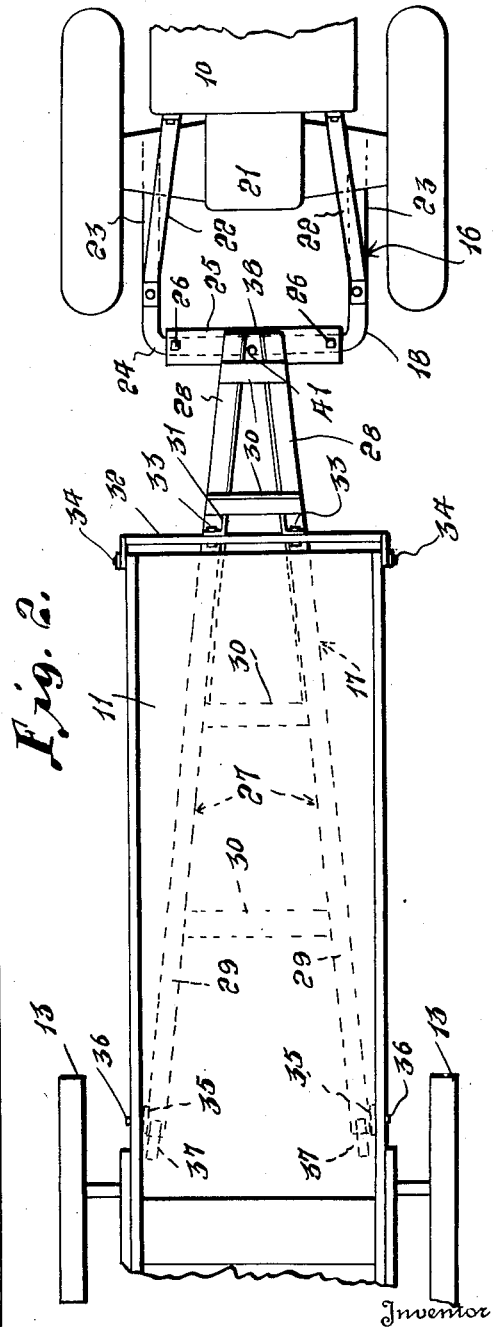
Inventor
Daniel S. Kalb
By L. F. Randreth
Attorney

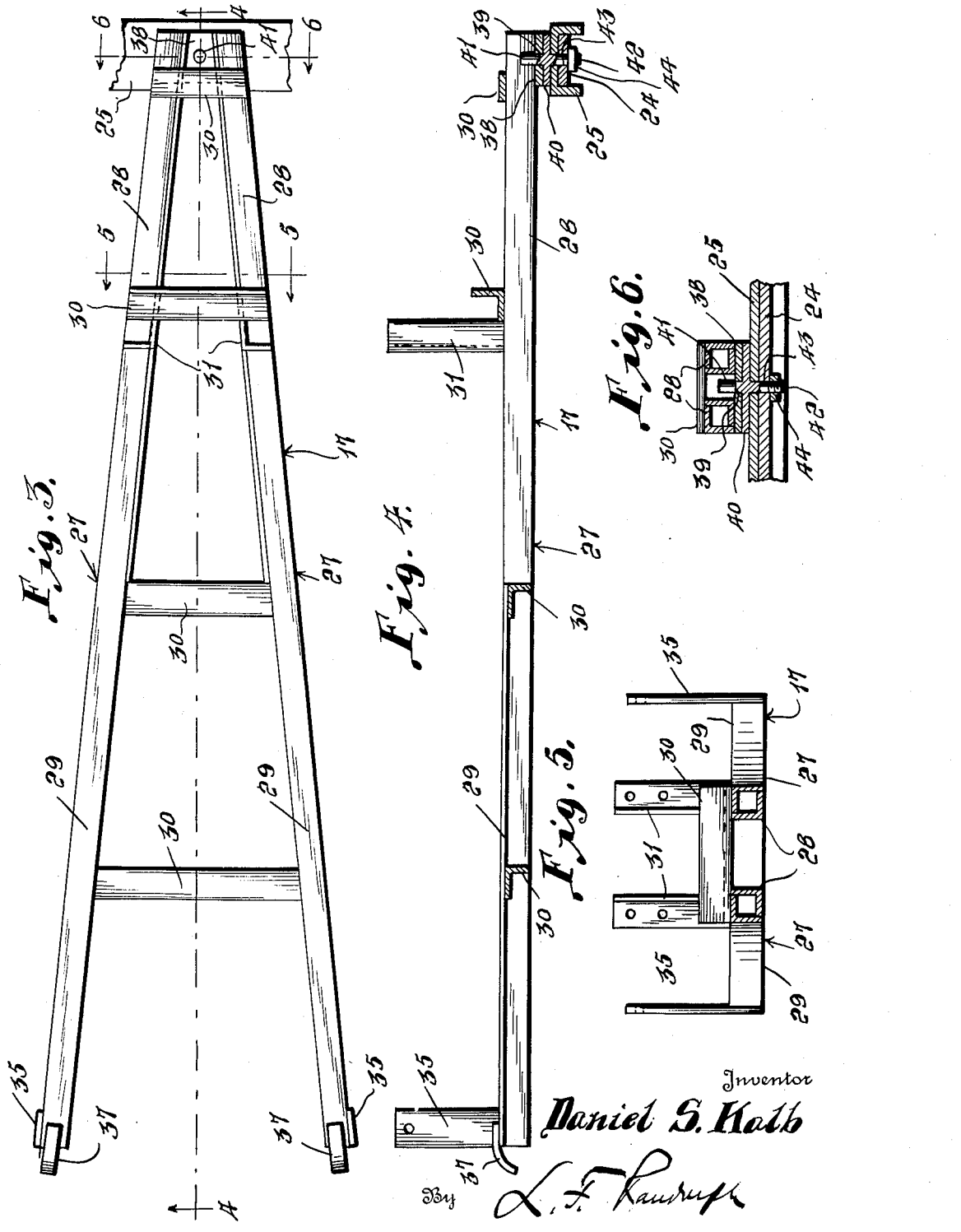

Patented Mar. 7, 1939

2,150,066

UNITED STATES PATENT OFFICE 2,150,066

TRAILER HITCH AND FRAME

Daniel S. Kalb, Chatfield, Ohio

Application June 2, 1938, Serial No. 211,434

3 Claims. (Cl. 280—33.44)

This invention relates to an improved trailer attachment particularly adapted for use with a two-wheeled manure spreader.

It is an aim of this invention to provide a trailer frame of simple construction adapted to be secured to a wagon body, provided with rear wheels, to support it and to connect it to a draft vehicle.

More particularly, it is an aim of this invention to provide an improved trailer attachment for manure spreaders and farm wagon bodies generally of a simple rigid construction which may be readily secured to a wagon body supported by a pair of rear wheels and having means adapted to be readily secured to the rear end of a draft vehicle and to be swivelly connected to the forward end of the body supporting the frame for attaching the wagon body to the draft vehicle.

Other objects and advantages of the invention will hereinafter become more fully apparent from the following description of the drawings, which illustrate a preferred form of the invention, and wherein:—

Figure 1 is a side elevational view of the device shown supporting a manure spreader and attached to a draft vehicle, Figure 2 is a top plan view of the same, Figure 3 is a top plan view of the trailer frame, Figure 4 is a longitudinal vertical central sectional view taken on the line 4—4 of Figure 3, and Figures 5 and 6 are cross sectional views taken on the lines 5—5 and 6—6 respectively of Figure 3.

Referring more particularly to the drawings wherein like reference characters designate like or corresponding parts throughout the different views, 10 designates the rear end of any conventional type of draft vehicle, and 11 a farm wagon body on the rear end of which is mounted a manure spreader mechanism 12 which is connected to a pair of rear wheels 13, in any suitable manner, the operation of the spreader being controlled by a conventional hand lever 14 connected to the spreader 12 by a chain 15. The wheels 13 besides operating the spreader 12 form the support for the rear end of the body 11.

This invention includes the combination of an improved trailer hitch, designated generally 16, and a trailer frame, designated generally 17, which are swivelly connected to each other and to the draft vehicle 10 and wagon body 11 respectively. The trailer hitch 16 as best seen in Figures 1 and 2, comprises a U-shaped member 18 having its opposite ends 19 offset upwardly and adapted to be secured by the fastenings 20 to any suitable part of the rear end of the draft vehicle 10, such as the rear axle housing 21. A pair of diagonally disposed braces 22 are secured at their ends to the draft vehicle 10 and to the side bars 23 of the U-shaped member 18 to brace the intermediate portion 24 of the member 18, which is disposed to the rear of the draft vehicle 10 and parallel to its axle housing 21. An inverted channel bar 25 is secured to the portion 24 by the fastenings 26.

The trailer frame 17 comprises the corresponding obliquely disposed longitudinal side bars 27, the forward converging ends 28, which are rectangular shaped in cross section, as seen in Figures 5 and 6, and the rear diverging ends 29, which are angle shaped as seen in Figure 4. Side bars 27 are held in a spaced relationship to each other by the spaced transverse braces 30 which are preferably angle shaped in cross section, as best seen in Figure 4.

Frame 17 adjacent its forward ends, is provided with the spaced uprights 31, preferably formed of angle iron, to which is secured a supporting member 32, by means of the fastenings 33. As seen in Figure 2, member 32 at its upper end is elongated and has its opposite ends bent to engage the opposite sides of the forward end of the wagon body 11, said ends being secured to the body by means of the fastenings 34. Bars 27 at their rear or diverging ends are provided with the upwardly extending supports 35 which are secured at their upper ends to the opposite sides of the wagon body 11 adjacent the wheels 13 by means of the fastenings 36 to combine with the members 31 and 32 to support the forward end and intermediate portion of the body 11.

The arcually shaped downwardly extending members 37 which are secured to and extend beyond the diverging ends of the bars 27, are adapted to be engaged by the chain 15 to hold said chain out of engagement with the axle of the wheels 13. Only one of the operating levers 14 and chains 15 have been shown, in Figure 1, since these parts are of conventional structure, but a corresponding lever 14 and chain 15 would be mounted on the opposite side of the wagon 10. The two levers 14 being used in conjunction to control the operation of the manure spreader 12.

As best seen in Figures 4 and 6, the forward end of the frame 17 is provided with a transversely disposed bearing or wear plate 38, which is secured to the under side of the converging ends of the side bars 27, and which is provided with a central opening 39. A wear plate or bearing 40 corresponding in dimensions to the plate 38 is adapted to be mounted on the channel member 25 intermediate the end of member 25 and portion 24, and is provided with an upwardly extending pin or shaft 41 adapted to extend through the opening 39 and to be journaled therein, and a downwardly extending threaded bolt 42 projecting through aligned openings 43 in portion 24 and member 25 and provided with a nut 44 on its free end to secure plate 40 to channel member 25.

From the foregoing it will be seen, that the frame 17 combines with the wheels 13 to support the wagon 11, and is in turn supported by the hitch 16 which is mounted on the rear end of the draft vehicle 10. The members 31, 32 and 35 provide means whereby the frame 17 may be readily attached to support wagon 11, and the braces 22 and fastenings 20 provide means for readily attaching or detaching hitch 16 to or from a draft vehicle 10. The weight of the forward end of the body 11 will retain the wear plate 38 in engagement with wear plate 40 when the pin 41 is in engagement with the opening 39, thereby providing an exceedingly simplified form of hitch connection between the draft and trailer vehicles permitting the trailer vehicle to be disengaged by merely lifting it out of engagement with pin 41. The abutting faces of wear plates 38 and 40 may be suitably lubricated so that the weight of the body 11 on these plates will not cause them to bind to prevent pin 41 from swivelling in opening 39. Due to the simplicity of construction of the device, which is one of the important advantages of the invention, a further description of the operation of the invention is considered unnecessary.

Obviously, various modifications and changes in the construction and arrangement of the parts forming the invention may obviously be made and are contemplated without departing from the principle thereof and the right is reserved to make such variations and changes in the construction and arrangement of the parts as will not depart from the spirit and scope of the invention as hereinafter defined by the appended claims.

I claim as my invention:

1. A manure spreader comprising in combination with a trailer body provided with a pair of rear wheels for supporting the rear end of said body; a trailer frame comprising a pair of obliquely disposed longitudinal side bars and spaced transverse braces connected to said side bars, upright supporting means secured to said side bars at their diverging ends and adjacent their converging ends, said supporting means being secured to the trailer body at its forward end and at its sides adjacent the rear wheels; and connecting means adapted to be secured to a draft vehicle and to project upwardly therefrom, said connecting means including a wear plate having an upwardly projecting pin, and a second wear plate attached to the forward converging end of said frame and provided with an opening to swivelly engage said pin to connect the trailer and draft vehicles.

2. A trailer frame comprising obliquely disposed longitudinal side bars and spaced transverse braces connecting said side bars, uprights secured to the diverging ends and to the intermediate portions of said side bars and adapted to be secured to a two wheel trailer body, means to connect the converging ends of said side bars, forming the forward end of said frame, to the drawbar of a draft vehicle, said means comprising an upper wear plate or bearing face secured to the underside of the forward end of said frame and provided with a central opening, and a lower wear plate having an upwardly projecting pin to engage said opening and to be swivelly mounted therein, a bolt depending from said lower wear plate and adapted to be removably secured to said drawbar to swivelly connect the frame and drawbar, said frame being adapted to support the forward end of the trailer body.

3. A device of the class described comprising a frame formed of obliquely disposed side rails adapted to be secured to a two wheel trailer vehicle with its converging end extending forwardly of said vehicle, a wear plate provided with a central opening secured to the forward end of said frame, a second wear plate, and a bolt extending through said second wear plate and provided with a threaded end adapted to be removably secured to the drawbar of a draft vehicle to position its wear plate thereon with the opposite end of said bolt projecting upwardly to engage the opening in the first mentioned wear plate to swivelly connect the trailer and draft vehicle.

DANIEL S. KALB.